United States Patent
Yanaba et al.

(10) Patent No.: US 10,271,007 B2
(45) Date of Patent: Apr. 23, 2019

(54) VIDEO OUTPUT APPARATUS, CONVERSION APPARATUS, VIDEO OUTPUT METHOD, AND CONVERSION METHOD

(71) Applicant: SONY INTERACTIVE ENTERTAINMENT INC., Tokyo (JP)

(72) Inventors: Koji Yanaba, Tokyo (JP); Kousuke Yoshimura, Tokyo (JP); Yuji Kawamura, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 15/959,284

(22) Filed: Apr. 23, 2018

(65) Prior Publication Data

US 2018/0338112 A1 Nov. 22, 2018

Related U.S. Application Data

(60) Provisional application No. 62/507,328, filed on May 17, 2017.

(51) Int. Cl.
*H04N 7/01* (2006.01)
*G09G 5/399* (2006.01)
(Continued)

(52) U.S. Cl.
CPC .............. *H04N 7/01* (2013.01); *G09G 5/005* (2013.01); *G09G 5/399* (2013.01);
(Continued)

(58) Field of Classification Search
CPC ........ H04N 7/01; H04N 5/005; H04N 5/0736; H04N 7/0105; H04N 7/0127; H04N 7/013; G09G 5/005; G09G 2370/12; G09G 5/399
(Continued)

(56) References Cited

U.S. PATENT DOCUMENTS 5,874,937 A * 2/1999 Kesatoshi .............. G09G 5/005
                                                    345/428
6,177,922 B1 * 1/2001 Schiefer ................. G09G 5/005
                                                    345/213
(Continued)

FOREIGN PATENT DOCUMENTS

WO     2006/068985 A2     6/2006

OTHER PUBLICATIONS

Cited in the Search Report dated Aug. 7 2018, for corresponding EP Patent Application No. 18168888.8.

*Primary Examiner* — Michael Lee
(74) *Attorney, Agent, or Firm* — HEA Law PLLC

(57) ABSTRACT

A video output apparatus that outputs video data in a first format to a conversion apparatus that converts and outputs the received data in the first format into data in a second format. The conversion apparatus sequentially outputs a blank signal, a vertical synchronization signal, and a blank signal. The video output apparatus includes a frame image data output unit that outputs the first frame image data to the conversion apparatus, a blank signal output unit that outputs a blank signal to the conversion apparatus, and a trigger signal output unit that outputs, to the conversion apparatus, a trigger signal to be converted into a vertical synchronization signal by the conversion apparatus.

9 Claims, 8 Drawing Sheets

(51) Int. Cl.
*G09G 5/00* (2006.01)
*H04N 5/073* (2006.01)

(52) U.S. Cl.
CPC ....... *H04N 5/0736* (2013.01); *G09G 2370/12* (2013.01); *H04N 7/013* (2013.01); *H04N 7/0105* (2013.01); *H04N 7/0127* (2013.01)

(58) Field of Classification Search
USPC ........................................................ 348/441
See application file for complete search history.

(56) References Cited

U.S. PATENT DOCUMENTS

| | | | |
|---|---|---|---|
| 6,836,294 B2* | 12/2004 | Miller | H04N 7/0135 348/441 |
| 8,791,896 B2* | 7/2014 | Kwon | G02F 1/167 345/107 |
| 2005/0012738 A1* | 1/2005 | Gong | G09G 5/006 345/212 |
| 2006/0050075 A1 | 3/2006 | Gong et al. | |
| 2008/0192060 A1 | 8/2008 | Ogiso | |
| 2009/0225088 A1 | 9/2009 | Aoki | |
| 2013/0127990 A1* | 5/2013 | Lin | H04N 13/139 348/43 |
| 2014/0184629 A1 | 7/2014 | Wyatt et al. | |

* cited by examiner

VIDEO OUTPUT APPARATUS, CONVERSION APPARATUS, VIDEO OUTPUT METHOD, AND CONVERSION METHOD

BACKGROUND

The present invention relates to a video output apparatus, a conversion apparatus, a video output method, and a conversion method.

There are standards of video output, such as DisplayPort and HDMI (registered trademark).

Some formats of video data defined by the standards of video output can handle variable frame rates. A GPU (Graphics Processing Unit) may not be able to write frame image data in a frame buffer at a stable frame rate in a system, such as a game system, in which the processing load of the system changes. Under the circumstances, for example, a format of data corresponding to variable frame rates can be adopted to minimize the latency.

The formats of video data defined by the standards of video output may or may not require output of a vertical synchronization signal (VSYNC signal) one predetermined time period before the timing of the start of the output of new frame image data.

SUMMARY

For example, a format of video data that can be displayed by a display apparatus may not be supported by a video output apparatus as an output source of the video. In that case, the display apparatus can display the video if, for example, the video data is supplied to the display apparatus after the format of the video data generated by the video output apparatus is converted into the format that can be displayed by the display apparatus.

Here, when, for example, video data in a format not requiring the output of the vertical synchronization signal is to be converted into a format requiring the output of the vertical synchronization signal, the output of the vertical synchronization signal to the display apparatus needs to be controlled to output the signal at an appropriate timing.

The present invention has been made in view of the circumstances, and an object of the present invention is to provide a video output apparatus, a conversion apparatus, a video output method, and a conversion method that can control output of a vertical synchronization signal at an appropriate timing when video data is output after the video data in a format not requiring the output of the vertical synchronization signal is converted into a format requiring the output of the vertical synchronization signal.

To solve the problem, a video output apparatus according to the present invention outputs video data in a first format to a conversion apparatus that converts the received video data in the first format into video data in a second format and that outputs the video data. The conversion apparatus is configured to sequentially output a blank signal for a period at least equal to or longer than a first fixed period, output a vertical synchronization signal, and output a blank signal for a second fixed period, between an end of output of first frame image data and a start of output of second frame image data. The video output apparatus includes a frame image data output unit that outputs the first frame image data stored in a frame buffer to the conversion apparatus, a blank signal output unit that outputs a blank signal to the conversion apparatus after the end of the output of the first frame image data, and a trigger signal output unit that outputs, to the conversion apparatus, a trigger signal to be converted into a vertical synchronization signal by the conversion apparatus. The trigger signal output unit outputs the trigger signal to the conversion apparatus in a period in which the blank signal is output to the conversion apparatus, at a timing after an end of writing of the second frame image data to a frame buffer and after an elapse of the first fixed period from a start of the output of the blank signal.

In an aspect of the present invention, when the blank signal is already output for equal to or longer than the first fixed period at a timing of the end of writing of the second frame image data to the frame buffer, the trigger signal output unit outputs the trigger signal to the conversion apparatus at the timing of the end of writing of the second frame image data to the frame buffer.

In an aspect of the present invention, when the blank signal is not output for equal to or longer than the first fixed period at the timing of the end of writing of the second frame image data to the frame buffer, the trigger signal output unit outputs the trigger signal to the conversion apparatus at a timing that the blank signal is output for the first fixed period.

In an aspect of the present invention, the trigger signal output unit outputs the trigger signal to the conversion apparatus at a timing after an elapse of the first fixed period from the timing of the end of writing of the second frame image data to the frame buffer.

In an aspect of the present invention, when the output of the first frame image data is not finished at the timing of the end of writing of the second frame image data to the frame buffer, the trigger signal output unit outputs the trigger signal to the conversion apparatus at a timing after an elapse of the first fixed period from a timing of an end of the output of the first frame image data.

A conversion apparatus according to the present invention converts received video data in a first format into video data in a second format and that outputs the video data. The conversion apparatus is configured to sequentially output a blank signal for a period at least equal to or longer than a first fixed period, output a vertical synchronization signal, and output a blank signal for a second fixed period, between an end of output of first frame image data and a start of output of second frame image data. The conversion apparatus includes a frame image data output unit that coverts the first frame image data received from a video output apparatus from the first format to the second format and that outputs the first frame image data, a blank signal output unit that converts the blank signal received from the video output apparatus from the first format to the second format and that outputs the blank signal, and a vertical synchronization signal output unit that converts the trigger signal received from the video output apparatus into the vertical synchronization signal and that outputs the vertical synchronization signal, at a timing after an end of writing of the second frame image data to a frame buffer included in the video output apparatus and after an elapse of the first fixed period from a start of the output of the blank signal.

Another video output apparatus according to the present invention includes a conversion unit that converts received video data in a first format into video data in a second format and that outputs the video data. The conversion unit is configured to sequentially output a blank signal for a period at least equal to or longer than a first fixed period, output a vertical synchronization signal, and output a blank signal for a second fixed period, between an end of output of first frame image data and a start of output of second frame image data. The video output apparatus further includes a first frame image data output unit that outputs the first frame image data stored in a frame buffer to the conversion unit, a first blank signal output unit that outputs a blank signal to the conversion unit after the end of the output of the first frame image data, and a trigger signal output unit that outputs, to the conversion unit, a trigger signal to be converted into a vertical synchronization signal by the conversion unit. The conversion unit includes a second frame image data output unit that coverts the first frame image data received from the first frame image data output unit from the first format to the second format and that outputs the first frame image data, a second blank signal output unit that converts the blank signal received from the first blank signal output unit from the first format to the second format and that outputs the blank signal, and a vertical synchronization signal output unit that converts the trigger signal received from the trigger signal output unit into the vertical synchronization signal and that outputs the vertical synchronization signal. The trigger signal output unit outputs the trigger signal to the conversion unit in a period in which the blank signal is output to the conversion unit, at a timing after an end of writing of the second frame image data to a frame buffer and after an elapse of the first fixed period from a start of the output of the blank signal.

A video output method according to the present invention outputs video data in a first format to a conversion apparatus that converts the received video data in the first format into video data in a second format and that outputs the video data. The conversion apparatus is configured to sequentially output a blank signal for a period at least equal to or longer than a first fixed period, output a vertical synchronization signal, and output a blank signal for a second fixed period, between an end of output of first frame image data and a start of output of second frame image data. The video output method includes a frame image data output step of outputting the first frame image data stored in a frame buffer to the conversion apparatus, a blank signal output step of outputting a blank signal to the conversion apparatus after the end of the output of the first frame image data, and a trigger signal output step of outputting, to the conversion apparatus, a trigger signal to be converted into a vertical synchronization signal by the conversion apparatus. In the trigger signal output step, the trigger signal is output to the conversion apparatus in a period in which the blank signal is output to the conversion apparatus, at a timing after an end of writing of the second frame image data to a frame buffer and after an elapse of the first fixed period from a start of the output of the blank signal.

A conversion method according to the present invention converts received video data in a first format into video data in a second format and outputs the video data. The conversion method is adapted to sequentially output a blank signal for a period at least equal to or longer than a first fixed period, output a vertical synchronization signal, and output a blank signal for a second fixed period, between an end of output of first frame image data and a start of output of second frame image data. The conversion method includes a frame image data output step of converting the first frame image data received from a video output apparatus from the first format to the second format and outputting the first frame image data, a blank signal output step of converting the blank signal received from the video output apparatus from the first format to the second format and outputting the blank signal, and a vertical synchronization signal output step of converting the trigger signal received from the video output apparatus into the vertical synchronization signal and outputting the vertical synchronization signal, at a timing after an end of writing of the second frame image data to a frame buffer included in the video output apparatus and after an elapse of the first fixed period from a start of the output of the blank signal.

A video output system according to the present invention includes a video output apparatus and a conversion apparatus that converts video data in a first format received from the video output apparatus into video data in a second format and that outputs the video data. The conversion apparatus is configured to sequentially output a blank signal for a period at least longer than a first fixed period, output a vertical synchronization signal, and output a blank signal for a second fixed period, between an end of output of first frame image data and a start of output of second frame image data. The video output apparatus includes a first frame image data output unit that outputs the first frame image data stored in a frame buffer to the conversion apparatus, a first blank signal output unit that outputs a blank signal to the conversion apparatus after the end of the output of the first frame image data, and a trigger signal output unit that outputs, to the conversion apparatus, a trigger signal to be converted into a vertical synchronization signal by the conversion apparatus. The conversion apparatus includes a second frame image data output unit that coverts the first frame image data received from the video output apparatus from the first format to the second format and that outputs the first frame image data, a second blank signal output unit that converts the blank signal received from the video output apparatus from the first format to the second format and that outputs the blank signal, and a vertical synchronization signal output unit that converts the trigger signal received from the video output apparatus into the vertical synchronization signal and that outputs the vertical synchronization signal. The trigger signal output unit outputs the trigger signal to the conversion apparatus in a period in which the blank signal is output to the conversion apparatus, at a timing after an end of writing of the second frame image data to a frame buffer and after an elapse of the first fixed period from a start of the output of the blank signal.

A video output method according to the present invention includes a first frame image data output step of outputting, by a video output apparatus, first frame image data stored in a frame buffer to a conversion apparatus to the conversion apparatus that converts video data in a first format received from the video output apparatus into video data in a second format and that outputs the video data, the conversion apparatus configured to sequentially output a blank signal for a period at least longer than a first fixed period, output a vertical synchronization signal, and output a blank signal for a second fixed period, between an end of output of the first frame image data and a start of output of second frame image data, a first blank signal output step of outputting, by the video output apparatus, a blank signal to the conversion apparatus after the end of the output of the first frame image data, and a trigger signal output step of outputting, by the video output apparatus, a trigger signal to be converted into a vertical synchronization signal by the conversion apparatus to the conversion apparatus. The video output method further includes a second frame image data output step of converting, by the conversion apparatus, the first frame image data received from the video output apparatus from the first format to the second format and outputting the first frame image data, a second blank signal output step of converting, by the conversion apparatus, the blank signal received from the video output apparatus from the first format to the second format and outputting the blank signal, and a vertical synchronization signal output step of converting, by the conversion apparatus, the trigger signal received from the video output apparatus into the vertical synchronization signal and outputting the vertical synchronization signal. In the trigger signal output step, the trigger signal is output to the conversion apparatus in a period in which the blank signal is output to the conversion apparatus, at a timing after an end of writing of the second frame image data to a frame buffer and after an elapse of the first fixed period from a start of the output of the blank signal.

DETAILED DESCRIPTION OF THE PREFERRED EMBODIMENTS

Hereinafter, embodiments of the present invention will be described with reference to the drawings.

Figure 1:
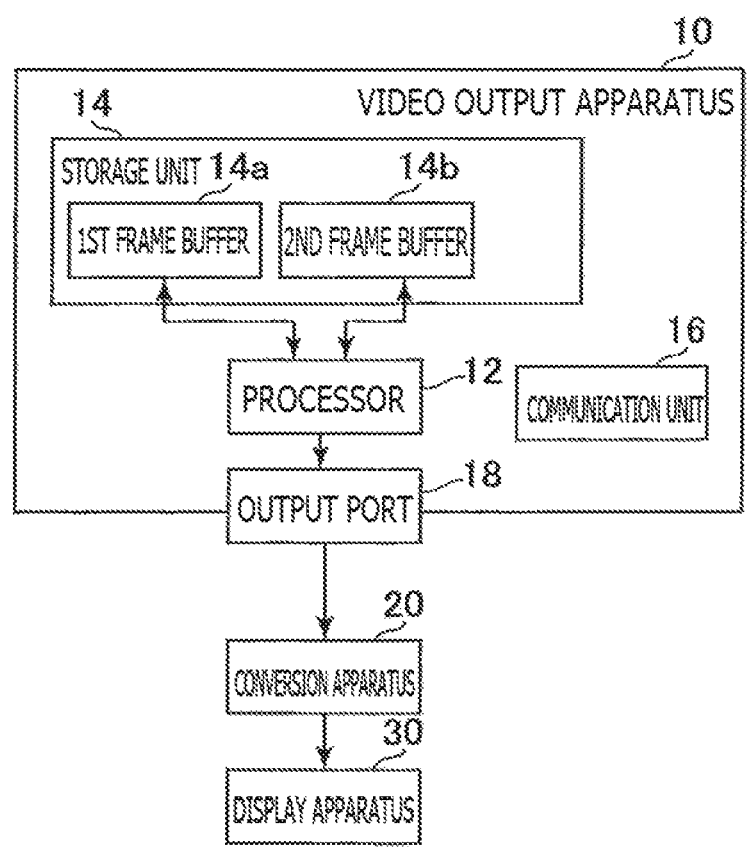
FIG. 1 is a diagram depicting an example of an overall configuration of a video display system according to an embodiment or the present invention.

FIG. 1 is a diagram depicting an example of an overall configuration of a video display system 1 according to the embodiment of the present invention.

As depicted in FIG. 1, the video display system 1 according to the present embodiment includes a video output apparatus 10, a conversion apparatus 20, and a display apparatus 30.

The video output apparatus 10 according to the present embodiment includes a processor 12, a storage unit 14, a communication unit 16, and an output port 18.

The processor 12 is, for example, a program control device, such as a CPU, that operates according to a program installed on the video output apparatus 10. The processor 12 according to the present embodiment also includes a GPU (Graphics Processing Unit) that draws an image in a frame buffer based on a graphics command or data supplied from the CPU.

The storage unit 14 is, for example, a storage element, such as a ROM and a RAM, or a hard disk drive. Programs and the like executed by the processor 12 are stored in the storage unit 14. An area of a first frame buffer 14a and an area of a second frame buffer 14b for the GPU to draw images are reserved in the storage unit 14 according to the present embodiment.

The communication unit 16 is, for example, a communication interface, such as a wireless LAN module.

The output port 18 is a port for outputting a video to the conversion apparatus 20 and is, for example, a DisplayPort port.

The conversion apparatus 20 in the present embodiment is, for example, an apparatus, such as a computer, that converts video data in a first format received from the video output apparatus 10 into video data in a second format and that outputs the video data to the display apparatus 30. For example, the conversion apparatus 20 converts video data in a format of DisplayPort into video data in a format of HDMI and outputs the video data to the display apparatus 30.

The display apparatus 30 in the present embodiment is, for example, a display, such as a liquid crystal display and an organic EL display, and is configured to display a video indicated by data received from the conversion apparatus 20.

The frame buffers according to the present embodiment are a double buffer system, and when a frame image is drawn (frame image data is written) in the first frame buffer 14a, the frame image data stored in the second frame buffer 14b is output. When a frame image is drawn (frame image data is written) in the second frame buffer 14b, the frame image data stored in the first frame buffer 14a is output. For example, flip processing is executed at a predetermined timing to switch the frame buffer used by the GPU to write the frame image data and the frame buffer used to output the stored frame image data.

Figure 2:
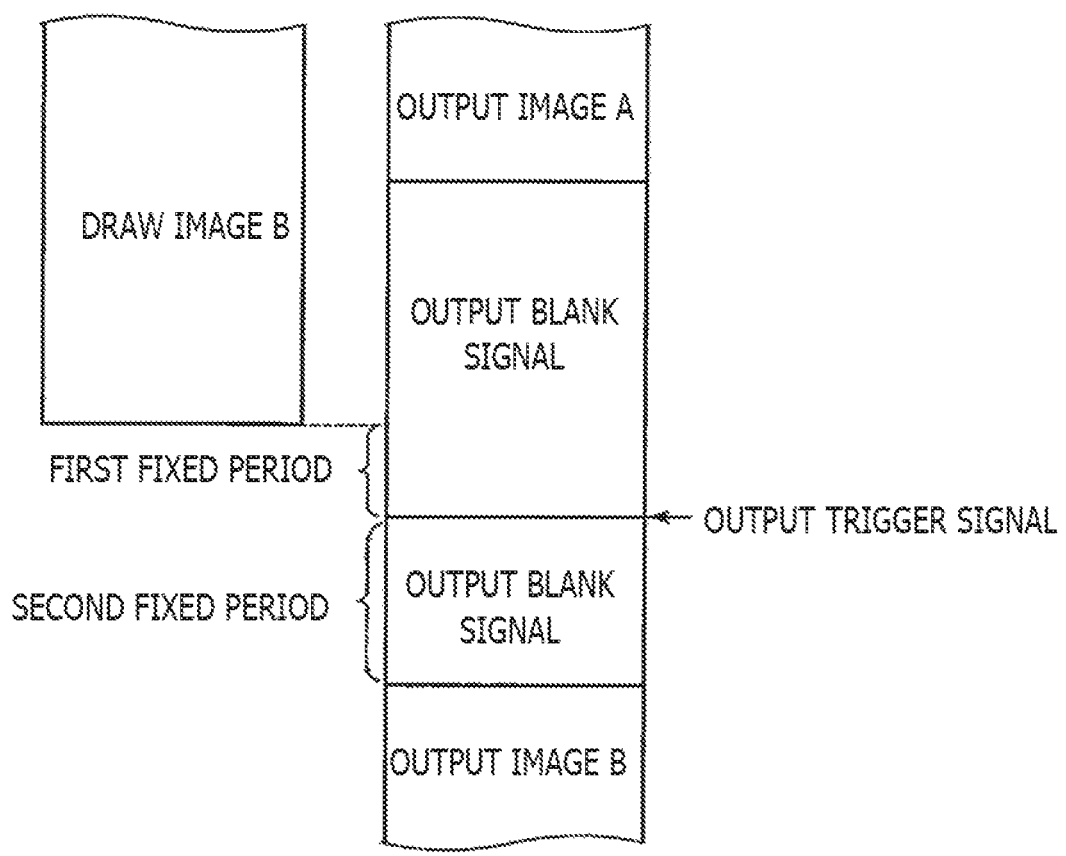
FIG. 2 is a diagram depicting an example of output timing of a trigger signal.
Figure 3:
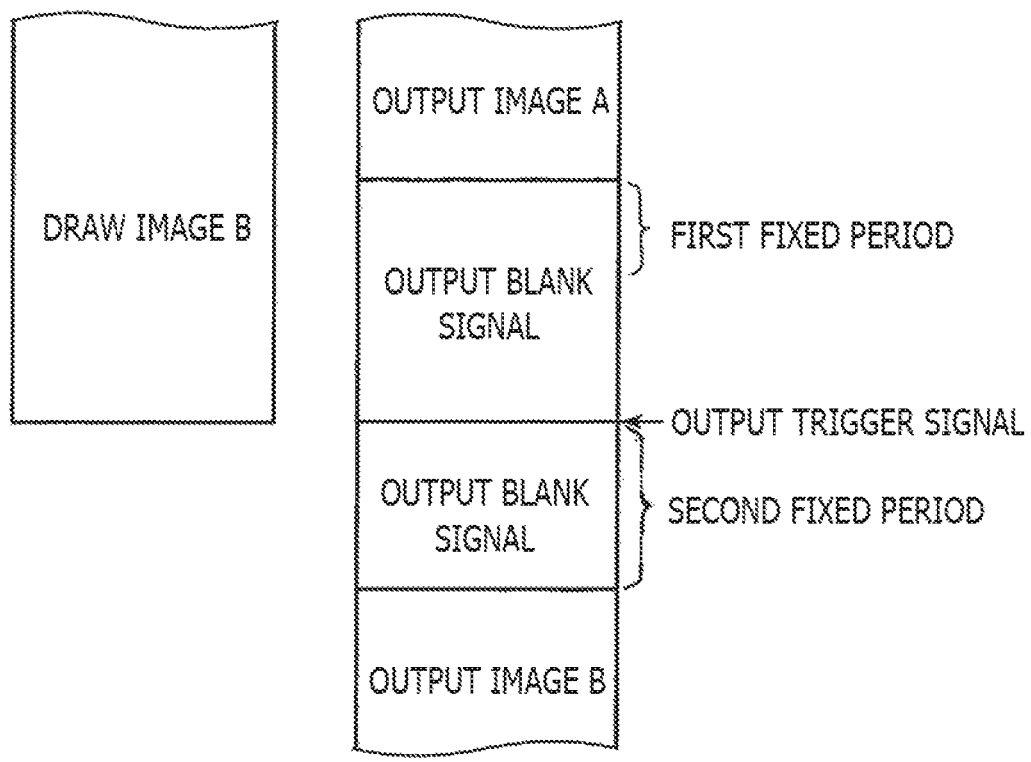
FIG. 3 is a diagram depicting another example of output timing of the trigger signal.
Figure 4:
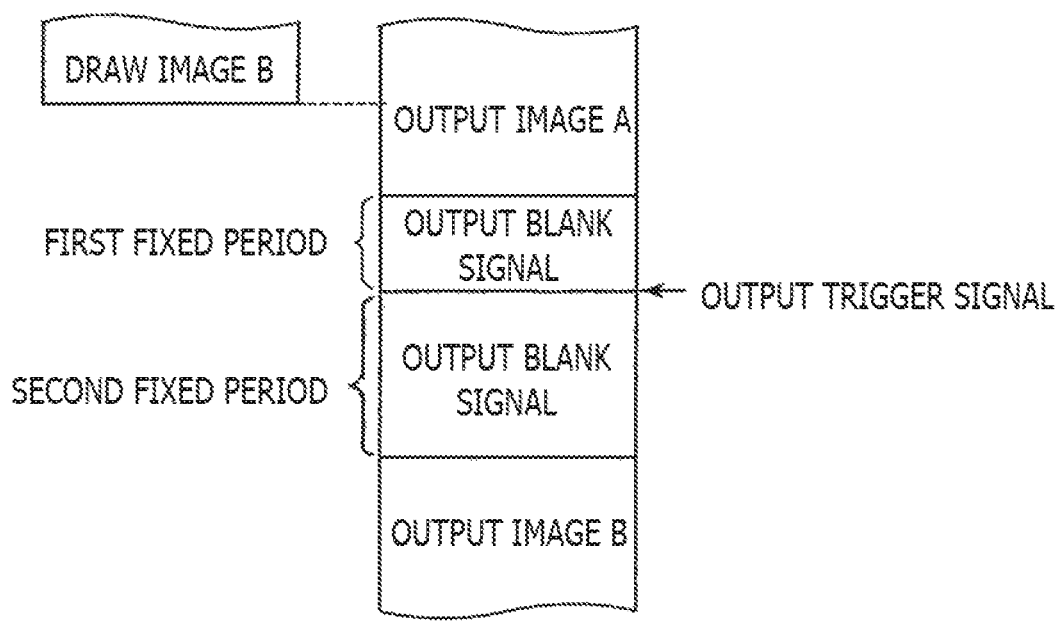
FIG. 4 is a diagram depicting yet another example of output timing of the trigger signal.

The video output apparatus 10 according to the present embodiment outputs a blank signal between an end of output of first frame image data corresponding to an image A and a start of output of second frame image data corresponding to an image B as depicted for example in FIGS. 2 to 4. Here, the second frame image data denotes frame image data output after the first frame image data. In the standard of DisplayPort, a vertical synchronization signal (VSYNC signal) does not have to be output one predetermined time period before the timing of the start of the output of the frame image data, unlike in the standard of HDMI. On the other hand, the vertical synchronization signal has to be output one predetermined time period before the timing of the start of the output of the frame image data in the standard of HDMI.

Therefore, in the present embodiment, a trigger signal to be converted into the vertical synchronization signal by the conversion apparatus 20 is output from the video output apparatus 10 to the conversion apparatus 20 at an appropriate timing as depicted in FIGS. 2 to 4.

The conversion apparatus 20 according to the present embodiment outputs the vertical synchronization signal in a period from the end of the output of the first frame image data to the start of the output of the second frame image data. Specifically, output of a blank signal for a variable period at least longer than a first fixed period, output of a vertical synchronization signal, and output of a blank signal for a second fixed period are sequentially executed in the period, for example. Here, the time period equivalent to the second fixed period corresponds to the predetermined time period.

The video output apparatus 10 according to the present embodiment sequentially outputs a blank signal, outputs a trigger signal to be converted into the vertical synchronization signal, and outputs a blank signal for the second fixed period as depicted in FIGS. 2 to 4 so that the output by the conversion apparatus 20 can be handled.

FIG. 2 illustrates an example in which the trigger signal is output to the conversion apparatus 20 at a timing after an elapse of the first fixed period from the timing of the end of writing of the second frame image data to the frame buffer, the second frame image data corresponding to the image B.

FIG. 3 illustrates a situation in which the output of the blank signal after the output of the first frame image data corresponding to the image A is already performed for equal to or longer than the first fixed period at the timing of the end of writing of the second frame image data to the frame buffer, the second frame image corresponding to the image B. In this situation, the trigger signal is output to the conversion apparatus 20 at the timing of the end of writing of the second frame image data to the frame buffer.

FIG. 4 illustrates a situation in which the output of the first frame image data corresponding to the image A is not finished yet at the timing of the end of writing of the second frame image data to the frame buffer, the second frame image data corresponding to the image B. In this situation, the trigger signal is output to the conversion apparatus 20 at a timing after an elapse of the first fixed period from the timing of the end of the output of the first frame image data corresponding to the image A.

Although the blank signal is output after the end of the output of the first frame image data corresponding to the image A at the timing of the end of writing of the second frame image data to the frame buffer, the blank signal may not be output for equal to or longer than the first fixed period. In this case, the trigger signal may be output to the conversion apparatus 20 at the timing of the output of the blank signal for the first fixed period after the output of the first frame image data corresponding to the image A.

In all of the examples of FIGS. 2 to 4, the trigger signal is output one time period equivalent to the second fixed period before the timing of the start of the output of the second frame image data corresponding to the image B. Therefore, the conversion apparatus 20 outputs the vertical synchronization signal one time period equivalent to the second fixed period before the timing of the start of the output of the second frame image data corresponding to the image B in all of the examples.

Hereinafter, functions of a video output system according to the present embodiment and processes executed by the video output apparatus 10 according to the present embodiment will be further described.

Figure 5:
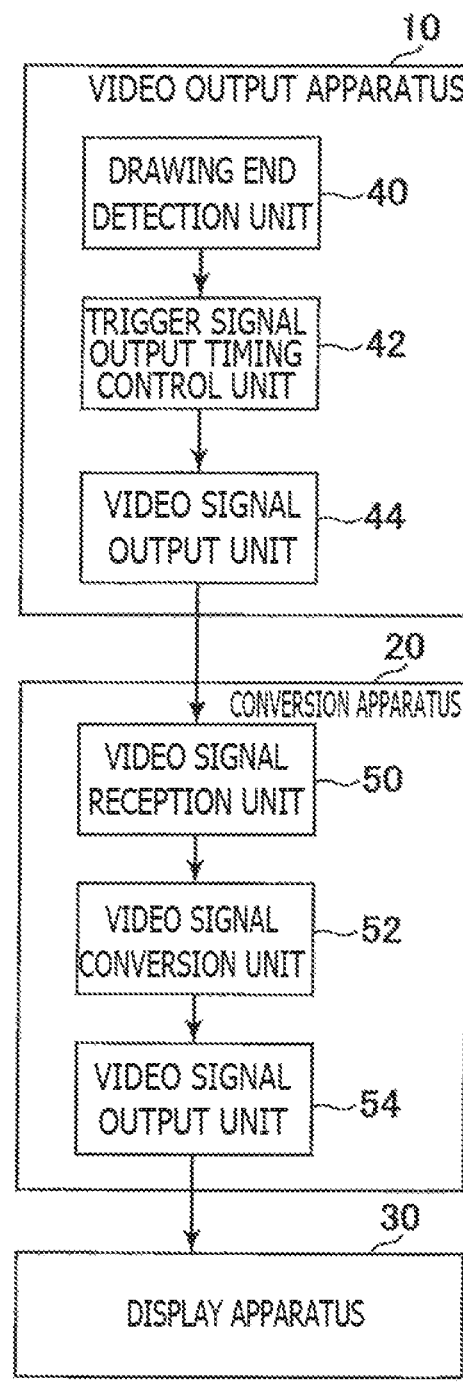
FIG. 5 is a functional block diagram depicting an example of functions provided in the video display system according to the embodiment of the present invention.

FIG. 5 is a functional block diagram depicting an example of the functions provided in the video output system according to the present embodiment. Note that the video output system according to the present embodiment may not be provided with all of the functions depicted in FIG. 5 and may also be provided with functions other than the functions depicted in FIG. 5.

As depicted in FIG. 5, the video output apparatus 10 according to the present embodiment includes a drawing end detection unit 40, a trigger signal output timing control unit 42, and a video signal output unit 44. The drawing end detection unit 40 and the trigger signal output timing control unit 42 are mainly constituted by the processor 12. The video signal output unit 44 is mainly constituted by the processor 12 and the output port 18.

The functions may be provided by the processor 12 executing programs installed on the video output apparatus 10 that is a computer, the programs including commands corresponding to the functions. The programs may be supplied to the video output apparatus 10 through, for example, a computer-readable information storage medium, such as an optical disk, a magnetic disk, a magnetic tape, a magneto-optical disk, and a flash memory, or through the Internet or the like.

As depicted in FIG. 5, the conversion apparatus 20 according to the present embodiment includes a video signal reception unit 50, a video signal conversion unit 52, and a video signal output unit 54.

The functions may be provided by the processor 12 executing programs installed on the conversion apparatus 20 that is a computer, the programs including commands corresponding to the functions. The programs may be supplied to the conversion apparatus 20 through, for example, a computer-readable information storage medium, such as an optical disk, a magnetic disk, a magnetic tape, a magneto-optical disk, and a flash memory, or through the Internet or the like.

The drawing end detection unit 40 detects, for example, the timing of the end of the drawing of the frame image by the GPU (writing of the frame image data to the frame buffer) in the present embodiment.

The trigger signal output timing control unit 42 controls, for example, the timing of the output of the trigger signal from the video output apparatus 10 to the conversion apparatus 20 in the present embodiment.

Here, the trigger signal output timing control unit 42 may activate a timer at the timing of the end of the drawing of the frame image by the GPU detected by the drawing end detection unit 40, for example. The trigger signal output timing control unit 42 may output an output instruction of the trigger signal to the video signal output unit 44 when the time period counted by the timer reaches the first fixed time period.

The trigger signal output timing control unit 42 may also determine the output timing of the trigger signal in response to the detection, by the drawing end detection unit 40, of the timing of the end of the drawing of the frame image by the GPU, for example.

For example, the output period of the blank signal after the output of the first frame image data may be specified in response to the detection of the timing. If the specified output period is equal to or longer than the first fixed period, the output instruction of the trigger signal may be output to the video signal output unit 44. If the specified output period is not equal to or longer than the first fixed period, the output instruction of the trigger signal may be output to the video signal output unit 44 at the timing that the blank signal is output for the first fixed period.

The trigger signal output timing control unit 42 may also verify whether or not the output of the first frame image data is finished in response to, for example, the detection of the timing. If the trigger signal output timing control unit 42 verifies that the output of the first frame image data is not finished, the trigger signal output timing control unit 42 may output the output instruction of the trigger signal to the video signal output unit 44 at a timing after an elapse of the first fixed period from the timing of the end of the output of the first frame image data.

The video signal output unit 44 outputs, for example, the video data in the first format to the conversion apparatus 20 in the present embodiment. Here, video data in the format according to the standard of displayPort is output to the conversion apparatus 20, for example. The video signal Output unit 44 outputs, for example, the frame image data, the blank signal, and the trigger signal. The video signal output unit 44 may output the trigger signal to the conversion apparatus 20 in the period in which the blank signal is output to the conversion apparatus 20, at the timing after the end of writing of the second frame image data to the frame buffer and after an elapse of the first fixed period from the start of the output of the blank signal.

Here, the video signal output unit 44 may output the trigger signal to the conversion apparatus 20 in response to reception of the output instruction of the trigger signal from the trigger signal output timing control unit 42.

The video signal reception unit 50 receives, for example, the video data in the first format output by the video signal output unit 44 in the present embodiment.

The video signal conversion unit 52 converts, for example, the video data in the first format received by the video signal reception unit 50 into video data in the second format in the present embodiment. Here, video data in the DisplayPort format may be converted into video data in the HDMI format, for example.

The video signal output unit 54 outputs the video data in the second format converted by the video signal conversion unit 52 to the display apparatus 30.

The display apparatus 30 then displays a video indicated by the video data in the second format received from the video signal output unit 54.

Figure 6:
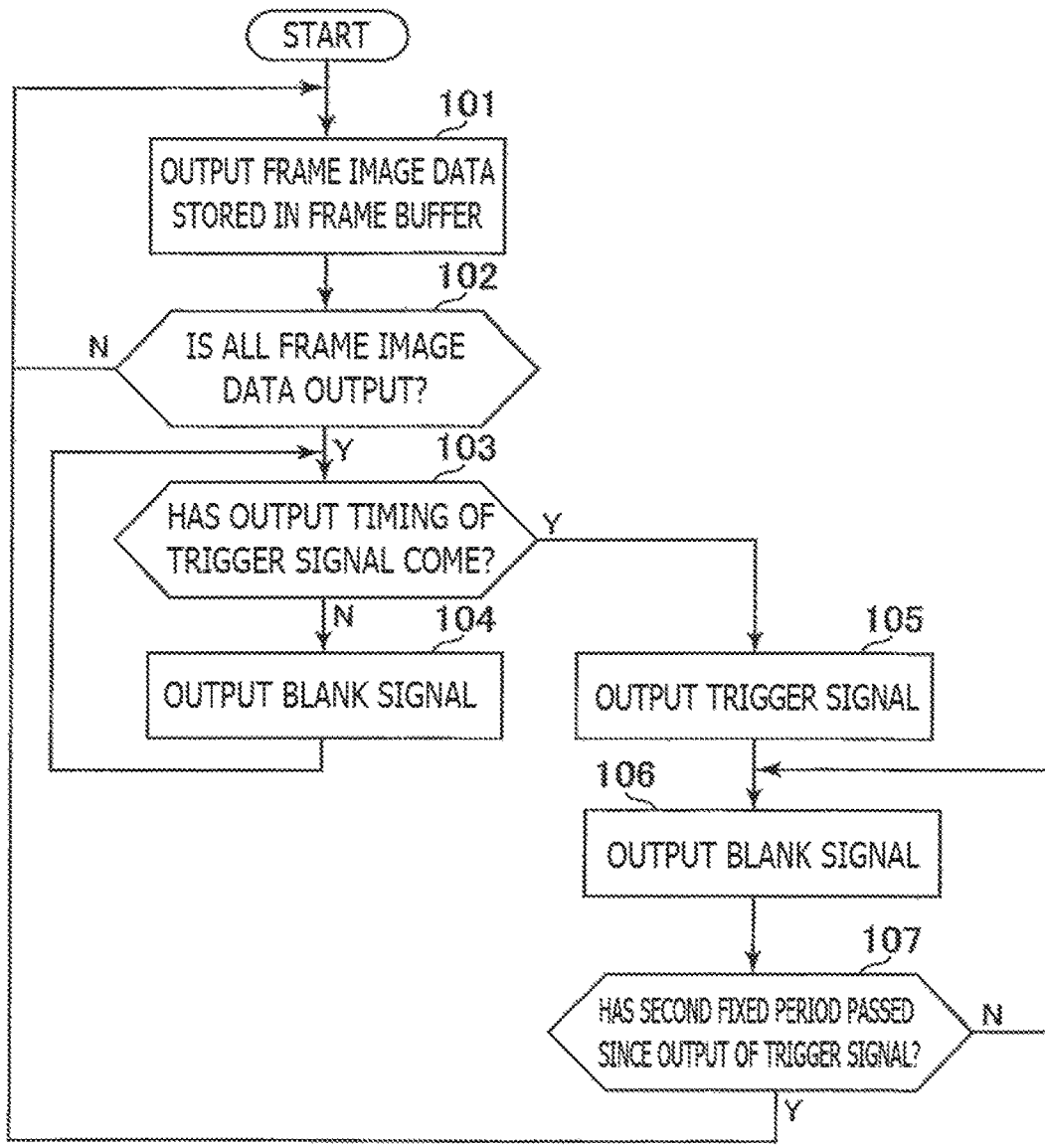
FIG. 6 is a flow diagram depicted an example of a flow of a process executed by a video output apparatus according to the embodiment of the present invention.

Hereinafter, an example of a flow of the output process of the video data in the first format executed by the video output apparatus 10 according to the present embodiment will be described with reference to a flow diagram illustrated in FIG. 6.

First, the video signal output unit 44 outputs the frame image data stored in the frame buffer to the conversion apparatus 20 (S101). In the present processing example, the frame image data stored in the first frame buffer 14a is output in the process depicted in S101, for example.

The video signal output unit 44 verifies whether or not all of the frame image data stored in the first frame buffer 14a is output (S102). If the video signal output unit 44 verifies that all of the frame image data is not output (S102: N), the process returns to S101.

If the video signal output unit 44 verifies that ail of the frame image data is output (S102: Y), the trigger signal output timing control unit 42 determines whether or not the output timing of the trigger signal has come (S103).

Here, if the trigger signal output timing control unit 42 determines that the output timing of the trigger signal has not come (S103: N), the video signal output unit 44 outputs the blank signal (S104). If the trigger signal output timing control unit 42 determines that the output timing of the trigger signal has come (S103: Y), the video signal output unit 44 outputs the trigger signal (S105) and then outputs the blank signal (S106).

The video signal output unit 44 then verifies whether or not the second fixed period has passed since the output of the trigger signal executed in the process depicted in S105 (S107). If the video signal output unit 44 verifies that the second fixed period has not passed (S107: N), the process returns to S106.

If the video signal output unit 44 verifies that the second fixed period has passed (S107: Y), the process returns to S101. In this case, the output of the frame image data stored in the second frame buffer 14b to the conversion apparatus 20 is started.

In the process depicted in S103, the trigger signal output timing control unit 42 may, for example, verify the time period counted by the timer activated at the timing of the end of the drawing of the frame image by the GPU detected by the drawing end detection unit 40 as described above. The trigger signal output timing control unit 42 may determine that the output timing of the trigger signal has come when the verified time period reaches the first fixed time period.

As described above, the trigger signal output timing control unit 42 may output the output instruction of the trigger signal to the video signal output unit 44 if the trigger signal output timing control unit 42 determines that the output timing of the trigger signal has come in the process depicted in S103. The video signal output unit 44 may output the trigger signal in response to the reception of the output instruction in the process depicted in S105.

Figure 7:
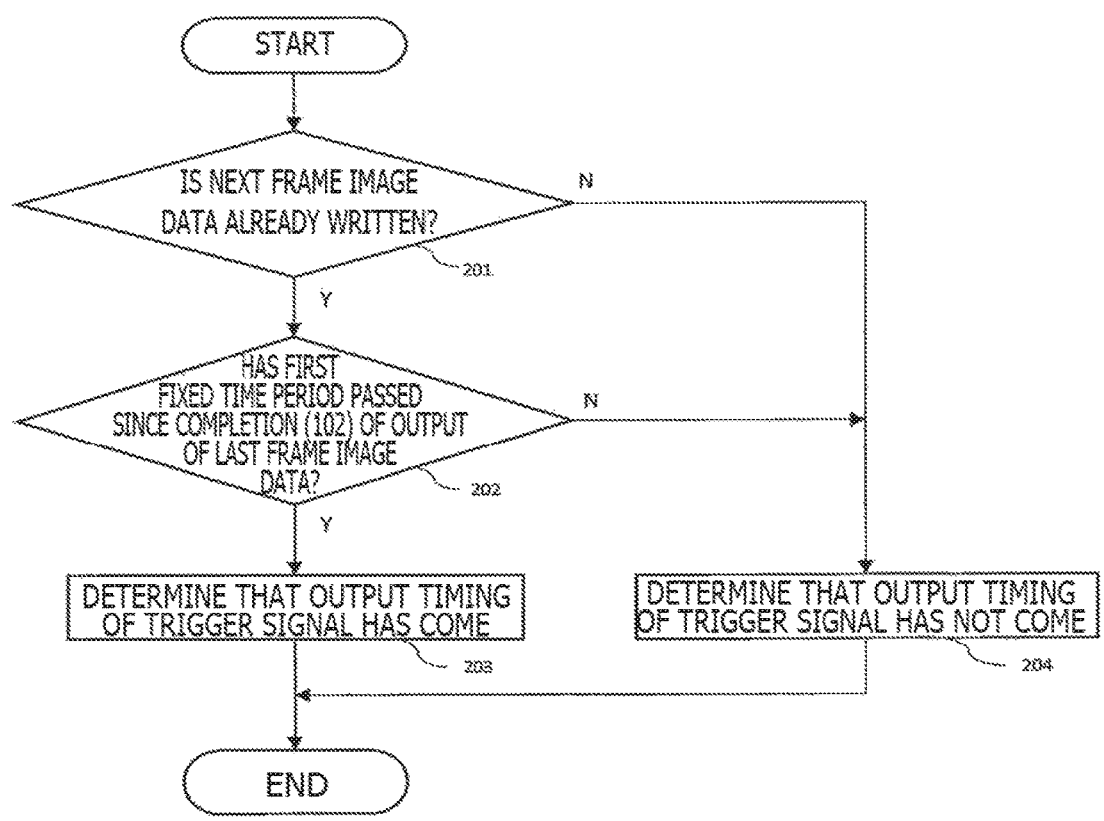
FIG. 7 is a flow diagram depicting an example of a flow of a process executed by the video output apparatus according to the embodiment of the present invention.

A process illustrated in FIG. 7 may also be executed in the process depicted in S103.

For example, the trigger signal output timing control unit 42 verifies whether the next frame image data is already written in the second frame buffer 14b (S201).

If the trigger signal output timing control unit 42 verifies that the next frame image data is already written (S201: Y), the trigger signal output timing control unit 42 verifies whether or not the first fixed time period has passed since the completion (S102) of the output of the last frame image data (S202).

If the trigger signal output timing control unit 42 verifies that the first fixed time period has passed (S202: Y), the trigger signal output timing control unit 42 determines that the output timing of the trigger signal has come (S203).

On the other hand, if the trigger signal output timing control unit 42 verifies that the next frame image data is not already written in the process depicted in S201 (S201: N), the trigger signal output timing control unit 42 determines that the output timing of the trigger signal has not come (S204). If the trigger signal output timing control unit 42 verifies that the first fixed time period has not passed in the process depicted in S202 (S202: N), the trigger signal output timing control unit 42 also determines that the output timing of the trigger signal has not come (S204).

Note that the present invention is not limited to the embodiment.

Figure 8:
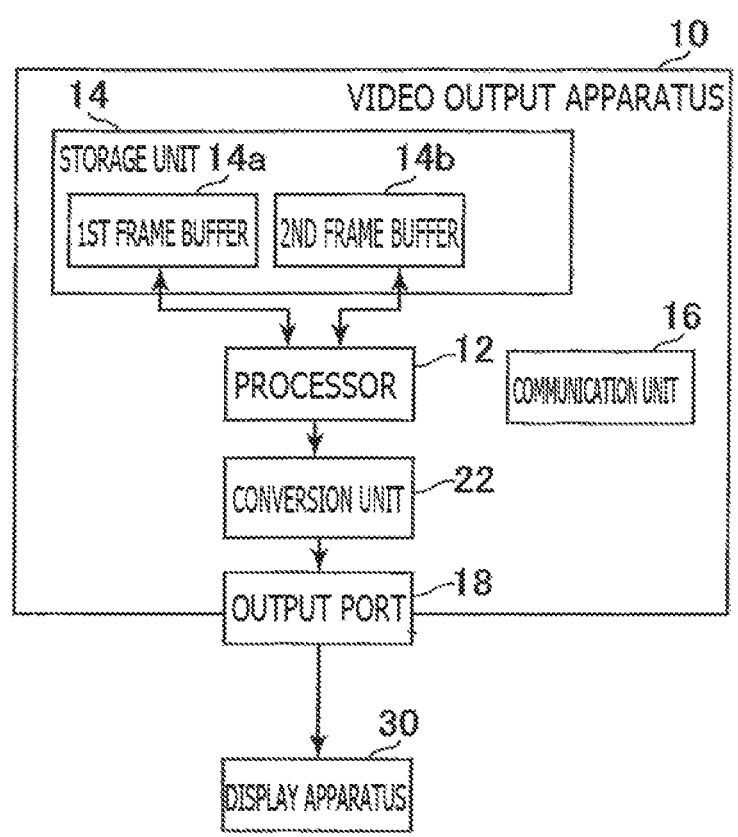
FIG. 8 is a diagram depicting an example of an overall configuration of the video display system according to another embodiment of the present invention.

For example, the functions of the conversion apparatus 20 depicted in FIG. 1 may be provided by a conversion unit 22 included in the video output apparatus 10 as depicted in FIG. 8. In this case, the processor 12 outputs the video data in the first format to the conversion unit 22. The conversion unit 22 converts the video data in the first format received from the processor 12 into the video data in the second format. The output port 18 then outputs the video data in the second format converted by the conversion unit 22 to the display apparatus 30.

The implementation of the trigger signal is not particularly limited, and the trigger signal can have any form. For example, the trigger signal may be a signal different from the blank signal or may be a signal in which a specific attribute included in data corresponding to the blank signal is set to a specific value. Furthermore, the trigger signal may be a signal in which a specific attribute value is added to the blank signal. Furthermore, the trigger signal may be, for example, a blank signal in which a predetermined value is set in DP Secondary Packet or DP VBID.

Furthermore, the specific character strings or numerical values described above and the specific character strings or numerical values in the drawings are exemplary, and the character strings and the numerical values are not limited to these.

What is claimed is:

1. A video output apparatus that outputs video data in a first format to a conversion apparatus that converts the received video data in the first format into video data in a second format and that outputs the video data, the conversion apparatus configured to sequentially output a first blank signal for a period at least equal to or longer than a first fixed period, output a vertical synchronization signal, and output a second blank signal for a second fixed period, between an end of output of first frame image data and a start of output of second frame image data, the video output apparatus comprising:

a frame image data output unit that outputs the first frame image data stored in a frame buffer to the conversion apparatus;

a blank signal output unit that outputs the first blank signal to the conversion apparatus after the end of the output of the first frame image data; and a trigger signal output unit that outputs, to the conversion apparatus, a trigger signal to be converted into the vertical synchronization signal by the conversion apparatus, wherein the trigger signal output unit outputs the trigger signal to the conversion apparatus in a period in which the first blank signal is output to the conversion apparatus, at a timing after an end of writing of the second frame image data to the frame buffer and after an elapse of the first fixed period from a start of the output of the second blank signal.

2. The video output apparatus according to claim 1, wherein when the first blank signal is already output for equal to or longer than the first fixed period at a timing of the end of writing of the second frame image data to the frame buffer, the trigger signal output unit outputs the trigger signal to the conversion apparatus at the timing of the end of writing of the second frame image data to the frame buffer.

3. The video output apparatus according to claim 1, wherein when the first blank signal is not output for equal to or longer than the first fixed period at the timing of the end of writing of the second frame image data to the frame buffer, the trigger signal output unit outputs the trigger signal to the conversion apparatus at a timing that the first blank signal is output for the first fixed period.

4. The video output apparatus according to claim 1, wherein the trigger signal output unit outputs the trigger signal to the conversion apparatus at a timing after an elapse of the first fixed period from the timing of the end of writing of the second frame image data to the frame buffer.

5. The video output apparatus according to claim 1, wherein when the output of the first frame image data is not finished at the timing of the end of writing of the second frame image data to the frame buffer, the trigger signal output unit outputs the trigger signal to the conversion apparatus at a timing after an elapse of the first fixed period from a timing of an end of the output of the first frame image data.

6. A conversion apparatus that converts received video data in a first format into video data in a second format and that outputs the video data, the conversion apparatus configured to sequentially output a first blank signal for a period at least equal to or longer than a first fixed period, output a vertical synchronization signal, and output a second blank signal for a second fixed period, between an end of output of first frame image data and a start of output of second frame image data, the conversion apparatus comprising:

a frame image data output unit that converts the first frame image data received from a video output apparatus from the first format to the second format and that outputs the first frame image data;

a blank signal output unit that converts the first blank signal received from the video output apparatus from the first format to the second format and that outputs the first blank signal; and a vertical synchronization signal output unit that converts a trigger signal received from the video output apparatus into the vertical synchronization signal and that outputs the vertical synchronization signal, at a timing after an end of writing of the second frame image data to a frame buffer included in the video output apparatus and after an elapse of the first fixed period from a start of the output of the second blank signal.

7. A video output apparatus comprising:

a conversion unit that converts received video data in a first format into video data in a second format and that outputs the video data, the conversion unit configured to sequentially output a first blank signal for a period at least equal to or longer than a first fixed period, output a vertical synchronization signal, and output a second blank signal for a second fixed period, between an end of output of first frame image data and a start of output of second frame image data;

a first frame image data output unit that outputs the first frame image data stored in a frame buffer to the conversion unit;

a first blank signal output unit that outputs the first blank signal to the conversion unit after the end of the output of the first frame image data; and a trigger signal output unit that outputs, to the conversion unit, a trigger signal to be converted into the vertical synchronization signal by the conversion unit, the conversion unit comprising:

a second frame image data output unit that converts the first frame image data received from the first frame image data output unit from the first format to the second format and that outputs the first frame image data, a second blank signal output unit that converts the second blank signal received from the first blank signal output unit from the first format to the second format and that outputs the second blank signal, and a vertical synchronization signal output unit that converts the trigger signal received from the trigger signal output unit into the vertical synchronization signal and that outputs the vertical synchronization signal, wherein the trigger signal output unit outputs the trigger signal to the conversion unit in a period in which the first blank signal is output to the conversion unit, at a timing after an end of writing of the second frame image data to the frame buffer and after an elapse of the first fixed period from a start of the output of the second blank signal.

8. A video output method of outputting video data in a first format to a conversion apparatus that converts the received video data in the first format into video data in a second format and that outputs the video data, the conversion apparatus configured to sequentially output a first blank signal for a period at least equal to or longer than a first fixed period, output a vertical synchronization signal, and output a second blank signal for a second fixed period, between an end of output of first frame image data and a start of output of second frame image data, the video output method comprising:

a frame image data output step of outputting the first frame image data stored in a frame buffer to the conversion apparatus;

a blank signal output step of outputting the first blank signal to the conversion apparatus after the end of the output of the first frame image data; and a trigger signal output step of outputting, to the conversion apparatus, a trigger signal to be converted into the vertical synchronization signal by the conversion apparatus, wherein in the trigger signal output step, the trigger signal is output to the conversion apparatus in a period in which the first blank signal is output to the conversion apparatus, at a timing after an end of writing of the second frame image data to the frame buffer and after an elapse of the first fixed period from a start of the output of the second blank signal.

9. A conversion method of converting received video data in a first format into video data in a second format and outputting the video data, the conversion method adapted to sequentially output a first blank signal for a period at least equal to or longer than a first fixed period, output a vertical synchronization signal, and output a second blank signal for a second fixed period, between an end of output of first frame image data and a start of output of second frame image data, the conversion method comprising:

a frame image data output step of converting the first frame image data received from a video output apparatus from the first format to the second format and outputting the first frame image data;

a blank signal output step of converting the first blank signal received from the video output apparatus from the first format to the second format and outputting the first blank signal; and a vertical synchronization signal output step of converting a trigger signal received from the video output apparatus into the vertical synchronization signal and outputting the vertical synchronization signal, at a timing after an end of writing of the second frame image data to a frame buffer included in the video output apparatus and after an elapse of the first fixed period from a start of the output of the second blank signal.

* * * * *